United States Patent [19]
Periman

[11] 3,835,462
[45] Sept. 10, 1974

[54] FISHING ROD BEEPER
[76] Inventor: Rubie E. Periman, Rt. 1, Box 1129, Owasso, Okla. 74055
[22] Filed: June 7, 1972
[21] Appl. No.: 260,377

[52] U.S. Cl. .................................. 340/279, 43/17
[51] Int. Cl. ......................................... G08b 21/00
[58] Field of Search ................... 340/279, 283, 259; 200/61.13; 43/16, 17

[56] References Cited
UNITED STATES PATENTS

| | | | |
|---|---|---|---|
| 2,619,559 | 11/1952 | Schenkel | 340/283 X |
| 2,643,371 | 6/1953 | Sleeger | 340/283 X |
| 2,948,076 | 8/1960 | Patricello | 340/283 UX |
| 3,359,672 | 12/1967 | Schwartz et al. | 43/17 |
| 3,555,716 | 1/1971 | Long et al. | 43/17 |
| 3,599,368 | 8/1971 | Riley | 340/283 X |
| 3,628,275 | 12/1971 | Howard | 43/17 |
| 3,645,028 | 2/1972 | Rayburn | 43/17 |
| 3,646,697 | 3/1972 | Jennings | 43/17 |
| 3,680,244 | 8/1972 | Cala | 340/279 |

Primary Examiner—John W. Caldwell
Assistant Examiner—William M. Wannisky
Attorney, Agent, or Firm—Head & Johnson

[57] ABSTRACT

A type of signaling device for use with a fishing pole and line, sounds a signal whenever there is a catch on the hook, which provides a pull on the fishing cord or on the fishing pole. In one embodiment a two-piece hinged frame is provided which can be forced into the ground as a standard. There is a tubular receptacle into which the fishing pole can be inserted. This receptacle is hinged to the frame and is opposed by an adjustable spring means. There is a push button mounted on the frame against which the receptacle can be pressed, against the force of the spring. This push button connects to a battery and signal means which can be a small light or horn. When the fishing pole is inserted in the socket and there is a pull on the fishing line, the receptacle will be rotated against the force of the spring and close the push button to sound the signal.

1 Claim, 8 Drawing Figures

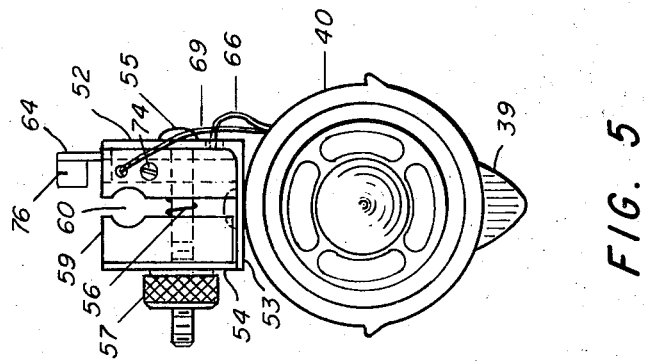
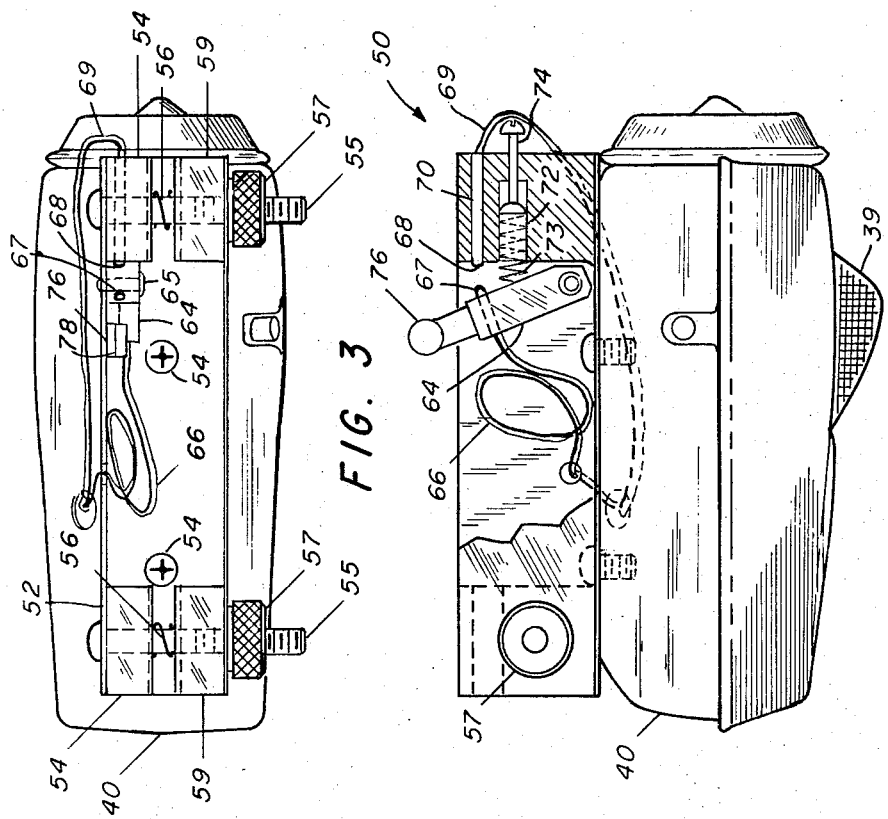

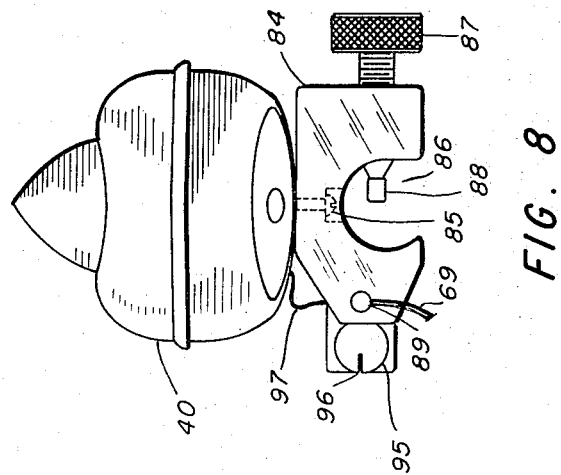
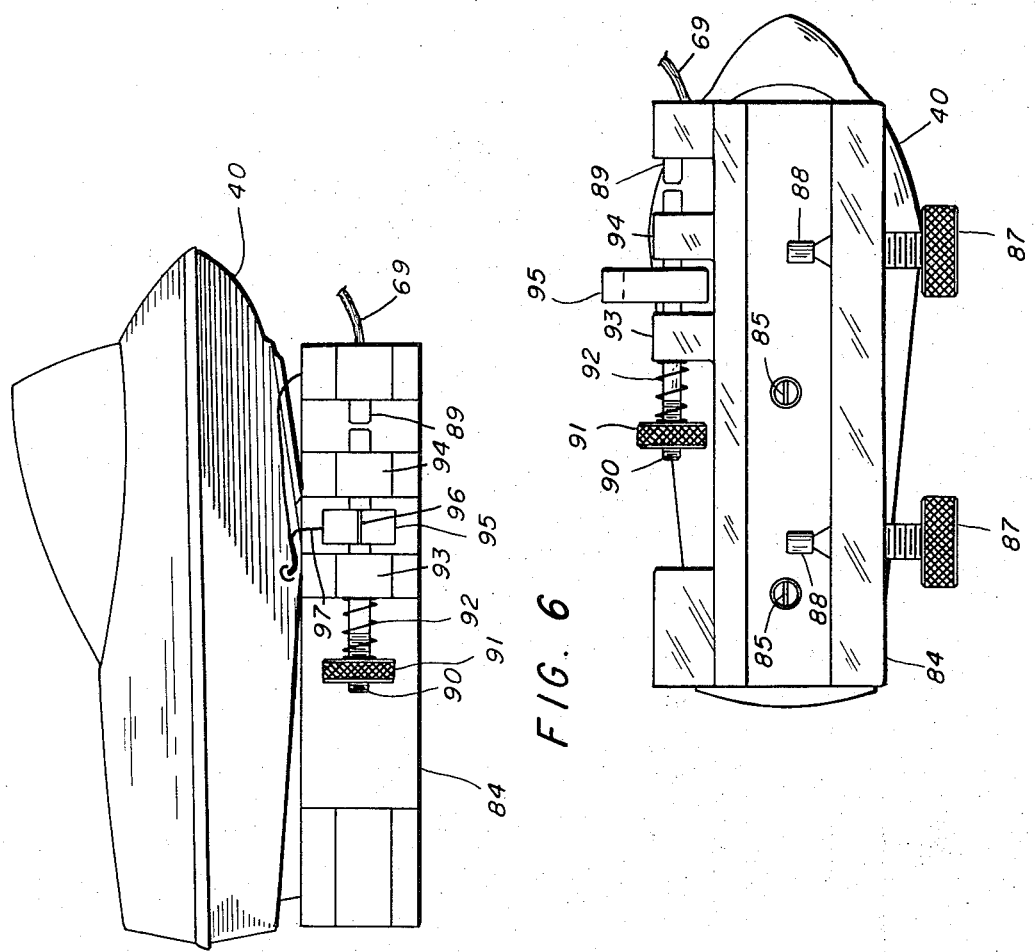

3,835,462

FISHING ROD BEEPER

BACKGROUND OF THE INVENTION

In the prior art there are a number of examples of devices which can be used in conjunction with a fishing pole or a fishing line, so that a signal can be sounded whenever there is a pull on the fishing line, such as when a fish is caught by the hook. This signal can alert the fisherman that a catch has been made.

In the prior art there are a number of examples of these devices, all of which have one or more defects or weaknesses in relation to the size of the device, the cost, and/or inconvenience in its use. While this invention has some similarities to the prior art, the overall design and system is an improved one, particularly in the convenience of use, and the simplicity of construction.

It is a principal object of this invention to provide a simple, inexpensive and easily portable device for use in conjunction with a fishing pole and fishing line, to provide a signal to the fisherman whenever there is a force on the fishing line. These and other objects of the invention and a better understanding of the principles and details of the invention will be evident from the following description taken in conjunction with the appended drawings, in which:

BRIEF DESCRIPTION OF THE DRAWINGS

FIGS. 3, 4 and 5 show views of a second embodiment which in use is attached to the fishing pole, and which has a rotatable contact means to which the fishing line is connected.

FIGS. 6, 7 and 8 show views of a third embodiment which is also attached to the fishing pole and has a longitudinally movable means which is tied to the fishing line.

DESCRIPTION OF THE PREFERRED EMBODIMENTS

Figure 2:
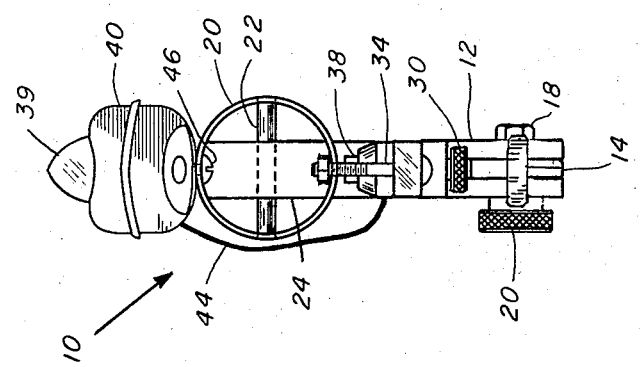
FIGS. 1 and 2 show front and side views of one embodiment of this invention in which there is provided a receptacle for the insertion of the fishing pole handle.
Figure 1:
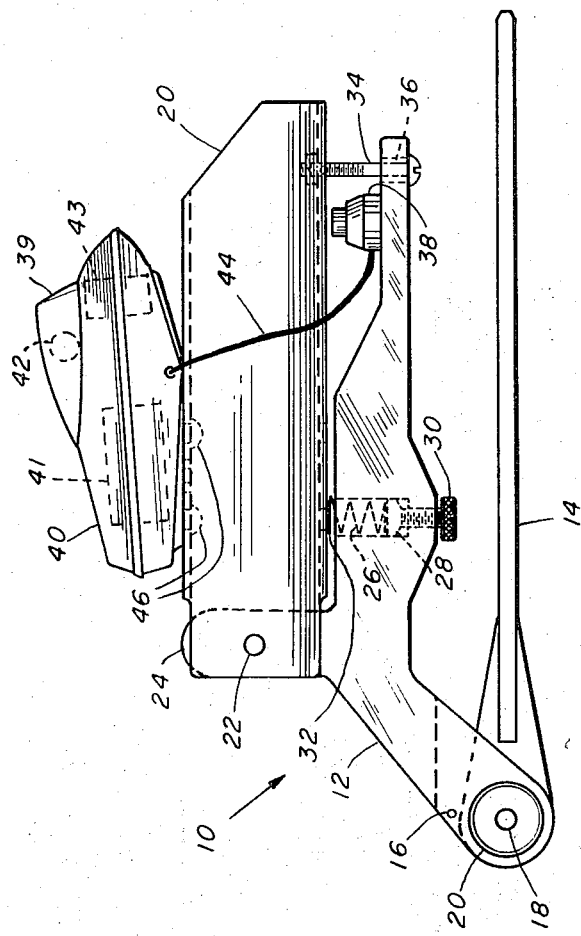

Referring now to the drawings and particularly to FIGS. 1 and 2, there is shown one embodiment of this invention indicated generally by the numberal 10. The apparatus comprises a folded framework 12 which has two hinged arms 12 and 14 which are hinged about a screw 18 with thumb nut 20, that provides means for tightening the joint. When the two are extended in a straight line the portion 14 which represents a pointed spade type of construction can be pressed into the earth with the upper portion 12 pointing roughly in a vertical direction. There is a tongue 24 which forms part of the upper frame 12, about which is hinged, through means 22, a tubular socket 20 into which can be inserted the handle of a fishing pole. The socket 20 has a limited range of motion which is limited in one direction by the frame 12 and in the other direction by the length of a screw 34 which passes through an opening 36 in the frame 12 and through a corresponding opening in the socket 20. The socket 20 is forced in a direction away from the frame 12 by means of a compression spring 26 which is inserted into a drilling hole 28 in the frame. The compression in the spring 26 can be changed by means of the thumb screw 30 which sets the force which is required to move the socket closer to the frame 12, where it can press on a push button 38 which is mounted on the frame 12. The push button is connected by wire 44 to a device 40 which is attached to the socket by means of screws 46. This is a self-contained unit which includes, as shown by the dashed outlines, a battery 41, an electric light 42, and a horn device 43. Whenever the push button is pressed the light lights, and is visible through a translucent plastic cover 39. Also the horn sounds and can be heard through openings in the front wall of the case 40.

In use the arms 14 and 12 are straightened out and the arm 14 is pressed into the earth so that the socket 20 is in a generally vertical direction. The fishing pole handle is inserted into the socket. The compression in the spring 26 is set by the screw 30 so that when a lateral pull is provided on the fishing line, the fishing pole will respond to the pull and will cause the socket 20 to be tilted in its hinge 22, and to make contact with the push button 38 and so sound the alarm.

The embodiment shown in FIGS. 1 and 2 provides not only a signaling means but also a means for supporting the fishing rod itself. The second embodiment shown in FIGS. 3, 4 and 5 and indicated generally by the numeral 50 provides only the signaling means, which is attached to the fishing pole itself. This comprises a simple framework 52 which is essentially a small sheet metal angle which is attached by screws 54 to the signaling device 40 which is similar to that shown in FIGS. 1 and 2. There are two blocks 54 attached to the sidewall of the frame 52, by means not shown. There are also two other blocks 59 which are attached to a strip 58. These blocks are drilled to accept screws 55 which have thumb nuts 57. Spaced between the two blocks on the screw is a compression spring 56 which tends to keep them separated, limited only by the position of the thumb nut. These blocks are grooved longitudinally to provide a somewhat cylindrical opening 60. In use the blocks are separated and spaced on opposite sides of the fishing rod, and the thumb nuts are clamped, tightening the blocks around the fishing rod, which is held in the cylindrical grooves 60.

Mounted to the sidewall 52 of the frame, which is positioned to the side of the fishing rod, is a hinged arm 64 which rotates about the pin 65. There is a recess 72 in the block 54, which holds a compression spring 73. A screw 74 is provided for adjustment of the compression in the spring 73. Also in the block 54 is a drilled hole 70 in which is inserted a contact rod 68 which extends through the block and is connected by a wire 69. There is a second contact rod 67 mounted in the arm 64. The arm 64 is of nonconducting material, and this second rod 67 is connected by a wire 66. Both wires 66 and 69 go to the signaling device 40.

The operation is similar to the embodiments of FIGS. 1 and 2, where the two contact rods 67 and 68 make contact in the same way that the push button 38 makes contact, whenever the arm 64 is pulled forward to bring the two contacts 67 and 68 together in opposition to the force of spring 73. There is a narrow slit 78 in the top of the arm 64 into which is inserted the fishing cord, so that it is held in frictional contact. Consequently a pull on the fishing cord will pull the arm 64 forward to make contact and sound the signal.

Referring now to FIGS. 6, 7 and 8 there is shown another embodiment of the invention which is similar to that of FIGS. 3, 4 and 5, in that the device is attached to the fishing rod. There is a body 84 to the device which has a longitudinal cylindrical groove 86. There are two thumb screws 87, the ends 88 of which are adjustably moved inward to press the fishing rod against the opposite wall of the groove so as to secure the body 84 to the fishing rod. A signal device 40, similar to those previously described, is mounted to the body by means of screws 85. Whereas in FIGS. 3, 4 and 5 the contact making arm 64 was adjusted for rotation, in this device one of the contacts 89 is fixed in the body 84, the other contact is a rod 90 which slides in coaxial openings in two bosses 93, 94 on the frame. There is a compression screen 92 which opposes motion in the forward direction, which can be adjusted by means of the thumb nut 91. There is a short arm 95 mounted on the rod 90 which has a narrow slot 96 into which can be slipped the fishing cord. Contact to the rod 90 is by means of wire 97. Connection to the forward connect 89 is by means of wire 69, which together go to the signaling device 40 as previously described.

When the body 84 is attached to the fishing pole and the cord is inserted in the slot 96, then a pull on the cord will cause the contact rod 90 to slide in a forward direction and make electrical contact with the rod 89 and so sound the alarm. The alarm device indicated by the numeral 40 which is self-contained and includes a power supply, a light and an audible sounder, is a device which is on the market for use on small vehicles such as bicycles, etc. The use of such a unitary device in combination with the apparatus of this invention makes for a simple design, convenient operation, and low cost.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element of step thereof is entitled.

What is claimed:

1. A signaling device for use by fishermen and comprising:
   a. a frame having a support portion pivotally secured to an arm, said arm of a substantially tapered configuration for being pressed into the earth to secure the support portion in a substantially vertical position, said support portion including a main arm having a tongue member rigidly secured thereto and substantially perpendicular with respect thereto;
   b. a single, cylindrical socket member hingedly secured at one end thereof to said tongue member for receiving one end of a fishing rod therein;
   c. spring means disposed within a recess provided in the main arm and extending laterally outwardly therefrom for yieldable engagement with the outer periphery of the socket member to maintain the socket member in a normal position slightly spaced from the main arm;
   d. a stop member secured to the main arm and extending into the interior of the cylindrical socket member for engagement therewith to limit the movement of the socket member in a direction away from the main arm;
   e. signal means secured to the outer periphery of the socket member;
   f. contact means carried by the main arm and operably connected with the signal means; and
   g. said socket member being selectively movable in a direction toward the main arm against the pressure of the spring means for engagement with the contact means to activate the signal means.

* * * * *